3,613,448
FLUID FLOW MEASURING APPARATUS
James M. Benson and Edmond Easter, Hampton, Va.,
assignors to Teledyne, Inc., Los Angeles, Calif.
Filed Nov. 26, 1969, Ser. No. 880,237
Int. Cl. G01p 5/14
U.S. Cl. 73—205 R                                9 Claims

ABSTRACT OF THE DISCLOSURE

Apparatus for measuring the flow of fluid through a main supply line which has a head element therein to develop a pressure drop. A shunt path having a restrictive element is provided to bridge the head element. The shunt path includes a thermal flowmeter comprising a conduit at least a portion of which is electrically and thermally conductive, the conductive portion having one or more thermoelectric devices positioned therealong. Heating current is passed through the conductive conduit portion, and the temperature gradient caused by fluid flow through the heated conduit is sensed by the thermoelectric devices to provide an indication of mass flow substantially independent of pressure and temperature. A source of purging fluid at high pressure is connected through bleed valves to the shunt path on opposite sides of the thermal flowmeter.

---

In United States Patent No. 3,443,434 issued on May 13, 1969, to William C. Baker, James M. Benson and Charles E. Hawk, there are disclosed fluid flow measuring apparatus in various forms each comprising a shunt path bridging a head element in the main supply line. The fluid, the flow of which is to be measured, passes through the main line, and a portion of this fluid is diverted through the shunt path. The shunt path includes a thermal flowmeter of any one of the several types described in detail in United States Patents 3,181,357 and 3,229,522 which issued respectively on May 4, 1965, and January 18, 1966, to James M. Benson.

With apparatus of the type set out in Patent 3,443,434 there are shortcomings which the present invention is intended to overcome. More particularly, diverting the fluid being measured through the thermal flowmeter in the shunt path may subject the flowmeter to clogging caused by debris carried in the main stream. Also, when corrosive fluids comprise the principal flow, the flowmeter is subjected to attack by the diverted fluid. A safety hazard is also introduced when the main stream is a combustible fluid since the introduction of such fluid to the thermal flowmeter may cause ignition which could spread to the main stream.

Such problems are solved by the provision of a purging arrangement wherein a clean purging fluid at high pressure is introduced to the shunt path on opposite sides of the thermal flowmeter. The purging fluid flows through the flowmeter due to the pressure differential across the head element in the main line and prevents the fluid being measured from being diverted into the shunt path. By isolating the thermal flowmeter from exposure to the main line fluid, the shortcomings just recited are overcome. Since only purging fluid passes through the flowmeter, the calibration of the meter is less affected by changes in the composition of the main line fluid than is the case when the latter fluid reaches the flowmeter. The purging arrangement also provides convenient means for cleaning the measuring apparatus.

Summarizing, the invention comprises the combination of: a main supply line having a head element therein; a shunt path including a thermal flow meter bridging the head element; and a purging fluid supplied to the shunt path at high pressure on opposite sides of the thermal flowmeter.

The invention will become more fully apparent when considered in light of the following detailed description of illustrative embodiments of the invention and from the appended claims.

Figure 1:
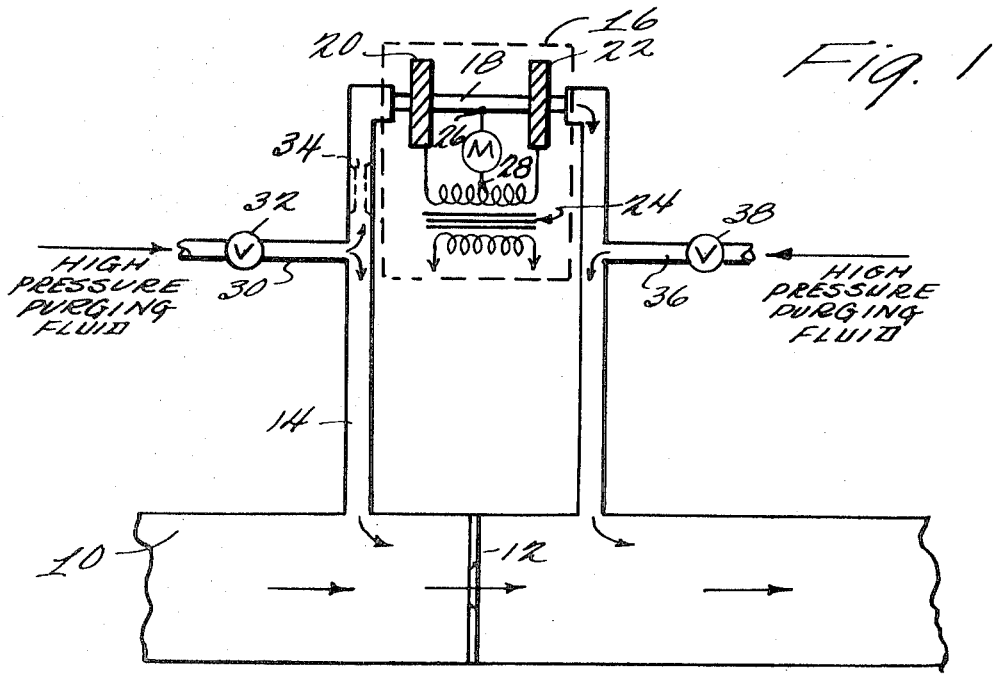
Figure 2:
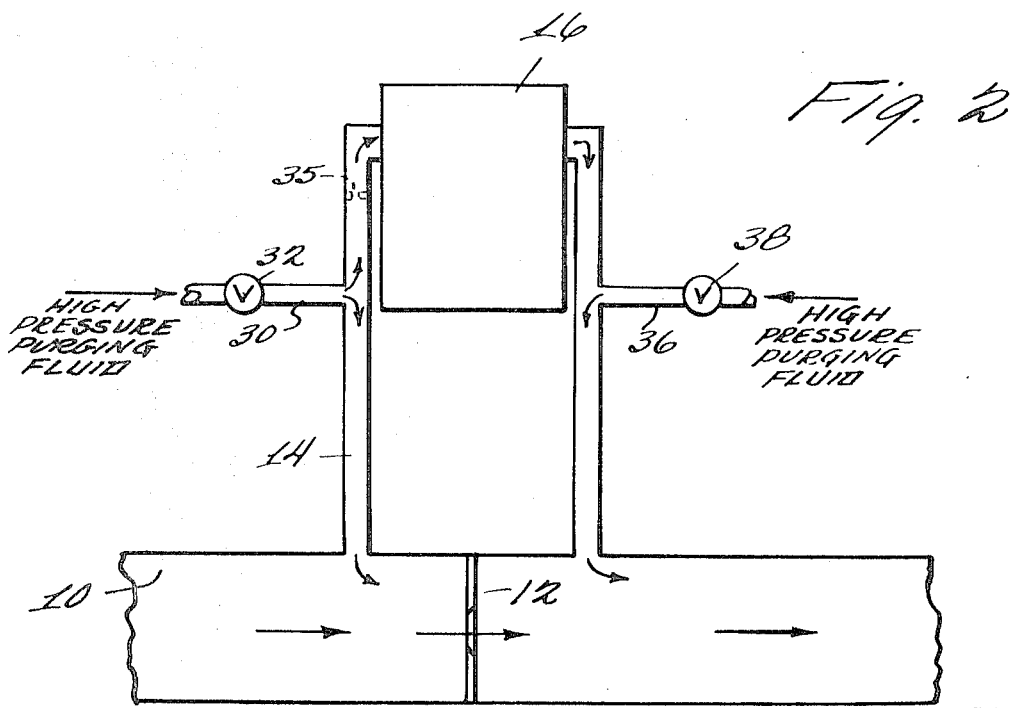

The illustrative embodiments may be best understood by reference to the accompanying drawings, wherein:

FIG. 1 is a schematic drawing illustrating a first embodiment of the invention; and FIG. 2 is a schematic drawing illustrating a second embodiment of the invention.

Referring now to FIG. 1, a first arrangement is illustrated for measuring the fluid flow in a main supply line, designated by the numeral 10, the fluid therein moving in a direction indicated by the arrowheads. A head element 12 in the form of an orifice plate is positioned in the supply line to develop a pressure drop which is proportional to the first power of the fluid density and the square of the velocity of the fluid. Although the head element is shown as an orifice plate, other devices could be employed such as pitot-static tubes, nozzles, venturi-shaped constrictions and the like.

A shunt path 14 bridges the main supply had element 12. The shunt path contains a thermal mass flowmeter 16 of the type described in the aforesaid United States Patents 3,181,357 and 3,229,522. Flowmeter 16 includes, for example, an electrically and thermally conductive conduit section 18 which forms a portion of shunt path 14. Conduit section 18 is coupled at its ends to heat sinks 20 and 22. The heat sinks are masses of material which remain substantially at the ambient temperature of their surroundings, even when heating current is passed through the sinks and through conduit section 18. However, conduit 18 is of lesser mass than the heat sinks, and therefore, it is heated to a temperature above its ambient surroundings as current is passed therethrough. A transformer 24 is connected to heat sinks 20 and 22 to drive heating current through conduit section 18 when the transformer is energized. A thermoelectric device 26, such as a thermocouple, is located along conduit 18. The thermoelectric device is connected through a meter M to point 28 on the secondary winding of transformer 24. Assuming that the secondary winding is of the same material as the heat sinks to which the winding is connected at its ends, the meter M responds to the difference in temperature between the junction point of the thermoelectric device and the heat sinks. The temperature sensed by the thermoelectric device 26 is proportional to the flow in conduit section 18.

The shunt path 14, between thermal flowmeter 16 and the main supply line upstream of orifice 12, is junctioned to a conduit 30 which carries clean purging fluid, such as nitrogen gas, under high pressure from a source (not shown) through a bleed valve 32 to the shunt path. Similarly, between flowmeter 16 and the main supply line 10 downstream of orifice plate 12 a further conduit 36 connects purging fluid at high pressure through bleed valve 38 to the shunt path 14.

Valves 32 and 38 are adjusted such that when there is no fluid flow in the main line 10, no flow of purging fluid exists through flowmeter 16. The purging fluid exhausts slowly and equally into the main supply line on opposite sides of plate 12. However, when flow of the fluid being measured occurs in the main supply line, the differential pressure drop across plate 12 causes the purging fluid passing valve 32 to move in the direction of the arrowheads to the main supply line and also through a viscous restriction, such as capillary 34, and through the flowmeter 16. The pressure drop across capillary 34 varies as the first power of the volume flow rate in path 14. The purging fluid passing valve 38 exhausts into the main supply line downstream of orifice plate 12. The purging fluid entering the main supply above and below plate 12 is a negligible diluent to the fluid in the main supply line.

As stated previously, the differential pressure across orifice plate 12 varies as the square of the volume flow rate, whereas the pressure drop in shunt path 14 across capillary 34 varies as the first power of the volume flow rate in path 14. Hence, the thermoelectric signal developed by flowmeter 16 varies as the square of the volume flow rate in the main line 10. By using as meter M one of the many forms of commercially available instruments designed to accept a signal and to extract the square root thereof, a display of the linearized function of the main line flow is achieved.

A significant feature of the arrangement just described is that measurement of mass flow in the main supply line is independent of the line pressure. This can be shown mathematically as follows:

$$\Delta P_1 = \Delta P_2$$

(where $\Delta P_1$ is the pressure drop across the orifice in the main supply line; and $\Delta P_2$ is the pressure drop across the capillary in the shunt path)

$$\Delta P_1 = C_1 \rho_1 V_1^2$$

and $$\Delta P_2 = C_2 \mu_2 V_2$$

where $C_1$ and $C_2$ are constants; $\rho_1$ is the density of the fluid in the main line, $\mu_2$ is the viscosity of the fluid in the shunt path (i.e. the purging fluid) $V_1$ and $V_2$ are the respective fluid velocities in each line)

if both fluids obey gas laws, $$\rho_1 = C_3 \rho_2$$

(where $C_3$ is a constant and $\rho_2$ is the density of the fluid in the shunt path)

Thus, $$C_1 \rho_1 V_1^2 = C_2 \mu_2 V_2$$

Multiplying each side by $\rho_1$:

$$C_1 \rho_1^2 V_1^2 = \rho_1 C_2 \mu_2 V_2$$

Replacing $\rho_1$ on the right-hand side of the equation:

$$C_1 (\rho_1 V_1)^2 = C_2 C_3 \mu_2 \rho_2 V_2$$

Since viscosity is constant over practical pressure ranges:

$$C_1 (\rho_1 V_1)^2 = C_5 \rho_2 V_2$$

(where $C_5 = C_2 C_3 \mu_2$)

Thus, this equation confirms what has been stated earlier that the mass flow in the shunt line varies as the square of the mass flow in the main line independent of the line pressure. The flow measured by flowmeter 16 varies as the viscosity of the purging fluid, but it is not affected by the viscosity or specific heat of the fluid in the main supply line. Although the embodiment just described illustrates the capillary 34 as separate from the flowmeter 16, it should be understood that if the conduit section 18 of the flowmeter is dimensioned as a capillary, the separate capillary 34 may be omitted.

The embodiment of FIG. 2 is identical to that of FIG. 1 with the exception that a restriction in the form of an orifice plate 35 is substituted in the shunt path 14 for the capillary 34 of FIG. 1. Plate 35, like plate 12 in the main supply line 10, restricts the flow such that the pressure drop across plate 35 is proportional to the first power of the density of the fluid passing therethrough and the square of the fluid velocity. Accordingly, the mass flow of the purging fluid through the thermal flowmeter is directly proportional to the mass flow of the fluid passing through main supply line 10. Thus, meter M may be calibrated to provide a direct reading of the main line mass flow.

In both of the embodiment described, the use of the purging arrangement affords substantial advantages. More particularly, the presence of a clean purging fluid under high pressure prevents corrosive fluids and debris from leaving the main line and passing through the thermal flowmeter via the shunt path. Thus, fouling of the flowmeter is retarded. A further beneficial result of the purging system is the reduction in the chance of ignition when a combustible fluid, such as natural gas, is carried in the main line. If a non-combustible purging fluid is employed, this fluid isolates the combustible main line fluid from the thermal flowmeter where ignition may possibly occur. A still further advantage is that calibration of the flowmeter is less affected by changes in composition of the main line fluid since only the purging fluid passes through the flowmeter. Although the flow of purging fluid does depend on the density of the main line fluid, it does not depend on its viscosity. The inclusion of a purging system also permits the measuring apparatus to be conveniently cleaned by opening wide the bleed valves.

The above-described embodiments are illustrative of preferred embodiments of the invention but are not intended to limit the possibilities of insuring the features of an extremely sensitive fluid flowmeter having a measuring device which is isolated from the fluid being measured. For a given situation, different thermal flowmeters of the type disclosed in the patents cited herein could be substituted for those which have been specifically illustrated and described. Also different restrictive elements in the main line and the shunt path could be employed. The arrangements described are examples of apparatus in which the inventive features of this disclosure may be utilized, and it will become apparent to one skilled in the art that certain modifications may be made within the spirit of the invention as defined by the appended claims.

What is claimed is:

1. Apparatus for measuring fluid flow through a main supply line, comprising:
   (a) a head element within the main line for developing a differential pressure thereacross;
   (b) a shunt path connected to the main line and bridging said head element;
   (c) a thermal flowmeter connected in said shunt path; and
   (d) means for supplying purging fluid to said shunt path at points on opposite sides of the thermal flowmeter.

2. Apparatus for measuring fluid flow as set forth in claim 1, further comprising a restriction in said shunt path interposed between the points where the purging fluid is supplied to the shunt path.

3. Apparatus for measuring fluid flow as set forth in claim 1, wherein said purging fluid supplying means includes valve means for controlling the supply of purging fluid to each side of the flowmeter.

4. Apparatus for measuring fluid flow as set forth in claim 3, further comprising a restriction in said shunt path interposed between the points where the purging fluid is supplied to the shunt path.

5. Apparatus for measuring fluid flow as set forth in claim 1, wherein said thermal flowmeter comprises:
   (1) a thermally and electrically conductive conduit section joined to said shunt path;

(2) means for electrically heating said conduit section; and (3) at least one thermoelectric device joined to said conduit section and responsive to the temperature of its junction with the conduit to develop an output representative of fluid flow in the main line.

6. Apparatus for measuring fluid flow as set forth in claim 5, wherein said purging fluid supplying means includes valve means for controlling the supply of purging fluid to each side of the flowmeter.

7. Apparatus for measuring fluid flow as set forth in claim 6, further comprising a restriction in said shunt path interposed between the points where the purging fluid is supplied to the shunt path.

8. Apparatus for measuring fluid flow as set forth in claim 5, further comprising a restriction in said shunt path interposed between the points where the purging fluid is supplied to the shunt path.

9. Apparatus for measuring fluid flow as set forth in claim 8, wherein said conduit section is a capillary which comprises said restriction.

References Cited

UNITED STATES PATENTS

| | | | |
|---|---|---|---|
| 3,422,682 | 1/1969 | Evans | 73—212 X |
| 3,443,434 | 5/1969 | Baker | 73—202 |

RICHARD C. QUEISSER, Primary Examiner

C. E. SNEE III, Assistant Examiner

U.S. Cl. X.R.

73—204